(12) United States Patent
Fu et al.

(10) Patent No.: US 12,456,286 B2
(45) Date of Patent: Oct. 28, 2025

(54) METHOD FOR INTERPRETING KIDNEY ULTRASOUND IMAGES WITH ARTIFICIAL INTELLIGENCE

(71) Applicant: Taichung Veterans General Hospital, Taichung (TW)

(72) Inventors: Lin-Shien Fu, Taichung (TW); Yueh-Chuan Chang, Taichung (TW)

(73) Assignee: TAICHUNG VETERANS GENERAL HOSPITAL, Taichung (TW)

( * ) Notice: Subject to any disclaimer, the term of this patent is extended or adjusted under 35 U.S.C. 154(b) by 303 days.

(21) Appl. No.: 18/446,968

(22) Filed: Aug. 9, 2023

(65) Prior Publication Data

US 2024/0054763 A1 Feb. 15, 2024

(30) Foreign Application Priority Data

Aug. 15, 2022 (TW) .................................. 111130534

(51) Int. Cl.
*G06V 10/764* (2022.01)
*G06T 7/00* (2017.01)

(52) U.S. Cl.
CPC .......... *G06V 10/764* (2022.01); *G06T 7/0012* (2013.01); *G06T 2207/10132* (2013.01); *G06T 2207/20081* (2013.01); *G06T 2207/30084* (2013.01)

(58) Field of Classification Search
CPC ................ G06V 10/764; G06T 7/0012; G06T 2207/10132; G06T 2207/20081; G06T 2207/30084
See application file for complete search history.

(56) References Cited

U.S. PATENT DOCUMENTS

| | | | | |
|---|---|---|---|---|
| 11,571,156 B2* | 2/2023 | Kuo | ...................... | A61B 5/201 |
| 11,969,289 B2* | 4/2024 | Bunn | ...................... | A61B 8/467 |
| 12,197,542 B2* | 1/2025 | Neumann | ............ | G06V 10/993 |
| 12,329,570 B2* | 6/2025 | Xie | .......................... | G06N 3/04 |

FOREIGN PATENT DOCUMENTS

CN 114783593 A 7/2022

* cited by examiner

*Primary Examiner* — Gregory M Desire
(74) *Attorney, Agent, or Firm* — MUNCY, GEISSLER, OLDS & LOWE, P.C.

(57) ABSTRACT

A method for interpreting kidney ultrasound images with artificial intelligence includes: using a deep-learning method on abnormal and non-anomalous kidney ultrasound images obtained from classification by experienced nephrological experts and via image pre-processing to obtain prediction modules, and upon or after obtaining the prediction modules, obtaining a rules module establishing specific rules for combination and sequence among the prediction modules, and obtaining an interpretation model from a combination of the prediction modules and the rules module to predict whether a kidney ultrasound image is abnormal; wherein each prediction module is used to determine the probability of predefined abnormal pattern, and the rules module provides the logic for determining the prediction modules. Accordingly, the method for interpreting kidney ultrasound images with artificial intelligence is able to allow non-kidney image interpretation experts to find kidney abnormality early and to use it as the basis for future remote medical care item.

7 Claims, 8 Drawing Sheets

| Name of image to be tested | Module 7 Abnormal probability | Module 7 Non-anomalous probability | Module 5 Abnormal probability | Module 5 Non-anomalous probability | Module 1 Abnormal probability | Module 1 Non-anomalous probability | Module 2 Abnormal probability | Module 2 Non-anomalous probability | Module 3 Abnormal probability | Module 3 Non-anomalous probability | Module 4 Abnormal probability | Module 4 Non-anomalous probability | Module 6 Abnormal probability | Module 6 Non-anomalous probability | Module 8 Abnormal probability | Module 8 Non-anomalous probability | Prediction result |
|---|---|---|---|---|---|---|---|---|---|---|---|---|---|---|---|---|---|
| 7.jpg | 98.822 | 1.178 | 100.0 | 0.0 | 99.847 | 0.153 | 0.004 | 99.996 | 63.652 | 36.348 | 99.998 | 0.002 | 99.323 | 0.677 | 77.848 | 22.152 | Abnormal |
| 12.jpg | 90.754 | 9.246 | 90.994 | 9.006 | 86.106 | 13.894 | 13.03 | 86.97 | 55.477 | 44.523 | 93.952 | 6.048 | 36.889 | 63.111 | 62.664 | 37.336 | Abnormal |
| 8.jpg | 90.46 | 9.54 | 85.055 | 14.945 | 64.016 | 35.984 | 10.22 | 89.78 | 54.81 | 45.19 | 98.592 | 1.408 | 37.308 | 62.692 | 57.246 | 42.754 | Abnormal |
| 4.jpg | 90.22 | 9.78 | 94.427 | 5.573 | 97.801 | 2.199 | 13.849 | 86.151 | 52.842 | 47.158 | 98.711 | 1.289 | 70.579 | 29.421 | 63.49 | 36.51 | Abnormal |
| 14.jpg | 89.878 | 10.122 | 71.036 | 28.964 | 30.721 | 69.279 | 15.263 | 84.737 | 55.103 | 44.897 | 86.31 | 13.69 | 11.134 | 88.866 | 43.855 | 56.145 | Abnormal |
| 20.jpg | 88.147 | 11.853 | 99.123 | 0.877 | 91.264 | 8.736 | 49.357 | 50.643 | 52.627 | 47.373 | 96.422 | 3.578 | 86.735 | 13.265 | 67.993 | 32.007 | Abnormal |
| 17.jpg | 88.024 | 11.976 | 86.357 | 13.643 | 33.127 | 66.873 | 52.104 | 47.896 | 51.079 | 48.921 | 97.518 | 2.482 | 36.443 | 63.557 | 56.294 | 43.706 | Abnormal |
| 6.jpg | 86.11 | 13.89 | 92.819 | 7.181 | 76.955 | 23.045 | 21.254 | 78.746 | 55.307 | 44.693 | 97.728 | 2.272 | 92.306 | 7.694 | 68.305 | 31.695 | Abnormal |
| 18.jpg | 78.778 | 21.222 | 44.307 | 55.693 | 87.373 | 12.627 | 3.07 | 96.93 | 45.261 | 54.739 | 55.188 | 44.812 | 40.579 | 59.421 | 62.599 | 37.401 | Abnormal |
| 16.jpg | 61.389 | 38.611 | 32.278 | 67.722 | 84.69 | 15.31 | 2.719 | 97.281 | 47.527 | 52.473 | 86.235 | 13.765 | 17.424 | 82.576 | 50.362 | 49.638 | Abnormal |
| 11.jpg | 59.442 | 40.558 | 32.536 | 67.464 | 71.138 | 28.862 | 22.121 | 77.879 | 40.755 | 59.245 | 41.241 | 58.759 | 9.348 | 90.652 | 50.418 | 49.582 | Abnormal |
| 1.jpg | 59.191 | 40.809 | 31.909 | 68.091 | 60.194 | 39.806 | 9.119 | 90.881 | 50.174 | 49.826 | 47.267 | 52.733 | 9.869 | 90.131 | 53.549 | 46.451 | Abnormal |
| 9.jpg | 54.776 | 45.224 | 74.358 | 25.642 | 70.347 | 29.653 | 34.075 | 65.925 | 54.476 | 45.524 | 93.545 | 6.455 | 18.653 | 81.347 | 60.353 | 39.647 | Abnormal |
| 5.jpg | 36.627 | 63.373 | 95.35 | 4.65 | 80.51 | 19.49 | 1.516 | 98.484 | 56.851 | 43.149 | 70.668 | 29.332 | 40.294 | 59.706 | 65.549 | 34.451 | Abnormal |
| 3.jpg | 16.095 | 83.905 | 89.676 | 10.324 | 75.679 | 24.321 | 0.76 | 99.24 | 23.498 | 76.502 | 38.47 | 61.53 | 19.309 | 80.691 | 21.484 | 78.516 | Abnormal |
| 10.jpg | 19.605 | 80.395 | 59.424 | 40.576 | 41.69 | 58.31 | 41.334 | 58.666 | 48.331 | 51.669 | 15.04 | 84.96 | 41.315 | 58.685 | 58.993 | 41.007 | Abnormal |
| 15.jpg | 42.524 | 57.476 | 56.196 | 43.804 | 48.411 | 51.589 | 46.649 | 53.351 | 55.131 | 44.869 | 50.975 | 49.025 | 11.617 | 88.383 | 58.375 | 41.625 | Abnormal |
| 13.jpg | 4.005 | 95.995 | 55.772 | 44.228 | 98.698 | 1.302 | 0.024 | 99.976 | 12.595 | 87.405 | 85.562 | 14.438 | 10.175 | 89.825 | 10.196 | 89.804 | Abnormal |
| 19.jpg | 0.004 | 99.996 | 30.247 | 69.753 | 99.99 | 0.01 | 0.0 | 100.0 | 0.144 | 99.856 | 1.692 | 98.308 | 0.004 | 99.996 | 1.237 | 98.763 | Non-anomalous |
| 2.jpg | 45.149 | 54.851 | 28.607 | 71.393 | 67.318 | 32.682 | 37.742 | 62.258 | 39.721 | 60.279 | 2.466 | 97.534 | 7.311 | 92.689 | 44.879 | 55.121 | Non-anomalous |

METHOD FOR INTERPRETING KIDNEY ULTRASOUND IMAGES WITH ARTIFICIAL INTELLIGENCE

BACKGROUND OF THE INVENTION

1. Technical Field

The present invention is related to an image determination technology, and in particular, to a method for interpreting kidney ultrasound images with artificial intelligence.

2. Description of Related Art

As the information technology advances, artificial intelligence (AI) image recognition technology has been applied to different clinical medicine fields in order to assist medical personnel to perform interpretation of diseases, such as fluorescence fundus for determining diabetic retinopathy. Accordingly, it is able to effectively reduce the burden of medical personnel as well as to further reduce medical cost, increase medical efficiency and service scope.

However, ultrasound image generation is closely related to the experience of an image taking operator, and noises and artifacts often occur in ultrasound images, causing the difficulty associated with the application of AI automatic interpretation to ultrasound images to be higher than magnetic resonance imaging (MRI) or computed tomography (CT) images. In other words, the application of current AI technology to image determination still has the drawback of inaccurate interpretation of images having relatively unclear features or relatively complicated clinical symptoms. In other words, presently, AI is still mostly applied to features or parts of images to be analyzed or comparison of images of features or parts with those showing symptoms, meaning that it is able to perform comparison and interpretation of one single image abnormality only, but it is unable to make an overall determination and classification on whether an ultrasound image is abnormal or non-anomalous based on the information of the image as an experienced clinical physician.

BRIEF SUMMARY OF THE INVENTION

A primary objective of the present invention is to provide a method for interpreting kidney ultrasound images with artificial intelligence, referring to a technology capable of screening abnormal kidney ultrasound images at a fast speed with high accuracy rate to the clinical medical end, thereby achieving the effects of early detection of renal abnormalities, saving medical resources and increasing diagnostic efficiency.

Another objective of the present invention is to provide a method for interpreting kidney ultrasound images with artificial intelligence, capable of being applied to various types of ultrasound machines, including the latest portable ultrasound machine and information communication transmission technologies or equipment, in order to achieve the effects of reading and interpreting a patient's kidney ultrasound images in real time locally onsite or from remote area.

Accordingly, to achieve the aforementioned objectives, the present invention provides a method for interpreting kidney ultrasound images with artificial intelligence, mainly comprising the following steps:

Step a: establishing a plurality of first training image sets and a second training image set; wherein the plurality of first training image sets correspond to an abnormal pattern classification, and each one of the plurality of training image sets comprises a plurality of kidney ultrasound images belonging to one of the abnormal patterns classified, and the second training image set comprises a plurality of non-anomalous kidney ultrasound images classified.

To be more specific, common kidney ultrasound image abnormal patterns are sorted into 8 types: hydronephrosis, large kidney cyst, small kidney cyst, large kidney stone, small kidney stone, hyperechoic kidney, integrated abnormality type 1 and integrated abnormality type 2. Among which, the integrated abnormality type 1 comprises the abnormalities of hydronephrosis, large kidney cyst, small kidney cyst, large kidney stone, small kidney stone and hyperechoic kidney, and the integrated abnormality type 2 comprises the abnormalities of hydronephrosis, large kidney cyst, large kidney stone and hyperechoic kidney. Accordingly, in Step a, the first training image sets are established according to the aforementioned 8 types of abnormal patterns respectively.

Step b: using at least one portion of the kidney ultrasound images in each one of first training image sets and at least one portion of the kidney ultrasound images in the second training set as a training data, using a deep-learning training model to perform classification and computation in order to obtain an interpretation model, wherein the interpretation model comprises a plurality of prediction modules and a rules module. According to an embodiment of the present invention, the interpretation model comprises 8 sets of prediction modules obtained via the machine deep-learning training model for the aforementioned 8 types of abnormal patterns respectively. The rules module refers to a model analysis logic, such as the selection rules, interpretation sequence of the prediction modules, obtained based on the prediction result of the 8 sets of prediction modules.

To be more specific, in an embodiment of the present invention, in Step b, according to a predefined weight, the plurality of kidney ultrasound images complying with a quantity of the predefined weight are respectively obtained from each one of first training image sets and the second training image set as the training data, and the remaining kidney ultrasound images are used as a test data, in order to verify the accuracy of the prediction module, and to optimize the prediction module via the method of adjusting the first and second training image sets and the deep-learning parameters. In another embodiment of the present invention, the rules module comprises a logic for selecting the prediction module, and when the quantity of the prediction module selected according to the rules module is greater than 1, the rules module further comprises an interpretation sequence or a combination method provided to the prediction modules.

Step c: performing analysis on a kidney ultrasound image to be analyzed based on the interpretation module in order to obtain a prediction classification result of the kidney ultrasound image to be analyzed, wherein the prediction classification result is used to understand the children kidney ultrasound image to be analyzed belongs to an abnormal classification or a non-anomalous classification.

In an embodiment of the present invention, each one of the first training image sets follows a predefined abnormal classification determination standard. To be more specific, the predefined abnormal classification standard can be defined as relaxed classification standard, intermediate classification standard or strict classification standard according to the abnormal probability. In the embodiment of the present invention, the children kidney ultrasound images are classified and determined manually or by machine first, such as nephrological expert performs abnormal pattern or non-anomalous determination on the kidney ultrasound images based on his/her clinical and/or image interpretation experience, following which the kidney ultrasound images are classified into first training image sets or a second training image set according to the classification determination result.

In the embodiment of the present invention, each one of the kidney ultrasound images and the kidney ultrasound image to be analyzed are obtained from original ultrasound images undergoing an image pre-processing procedure. To be more specific, the image pre-processing procedure comprises the following steps:

Step a1: cleaning an auxiliary information in the original ultrasonic image; wherein the auxiliary information comprises a text, a pattern, a symbol or a combination of at least two thereof, in order to obtain a clean drawing;

Step a2: selecting and circling a kidney location from the drawing, and capturing a region of interest; wherein the region of interest comprises a portion corresponding to an image of a kidney, and may also comprise at least a portion of other tissue adjacent to the kidney.

In addition, to further increase the accuracy of the prediction module, images nonconforming with a training standard in the image pre-processing procedure have been eliminated, such as poor resolution, and improper photography position, etc.

In an embodiment of the present invention, in Step b, a portion of the plurality of kidney ultrasound images are respectively obtained from each one of first training image sets and the second training image set as the training data, and the remaining kidney ultrasound images are used as a test data, in order to verify the accuracy of the prediction module.

The interpretation model obtained via the aforementioned method can be applied to a system for interpreting kidney ultrasound images with artificial intelligence. Accordingly, in another embodiment of the present invention, the present invention discloses a system for interpreting kidney ultrasound images with artificial intelligence, comprising a processing unit, an ultrasound machine and a display unit, and the aforementioned elements are connected to each other via a wired or wireless method for transmitting information and/or data. In addition, the ultrasound machine includes an image generation member for transmitting the kidney ultrasound original image to the processing unit. The processing unit includes a processing member for receiving a kidney ultrasound original image, and after performing an image pre-processing procedure, using the interpretation model to perform analysis and to obtain a prediction result, in order to understand a classification of an abnormal pattern or a non-anomalous pattern of a kidney and an accuracy rate thereof. The display unit receives and presents the prediction result.

In another embodiment of the present invention, the display unit may present the prediction result in text, graph, table, color, pattern, symbol or a combination of at least two thereof.

BRIEF DESCRIPTION OF THE SEVERAL VIEWS OF THE DRAWINGS

FIG. 3, (A) is an operation schematic view showing the image pre-process performed on the original children kidney ultrasound image of abnormal pattern 1 in Step 101 of an embodiments of the present invention.

FIG. 3, (B) is an operation schematic view showing the image pre-process performed on the original children kidney ultrasound image of abnormal pattern 6 in Step 101 of an embodiments of the present invention.

FIG. 6A shows a result of using the method for interpreting kidney ultrasound images with artificial intelligence disclosed by the present invention to perform kidney ultrasound image abnormal prediction.

DETAILED DESCRIPTION OF THE INVENTION

The present invention provides a method for interpreting kidney ultrasound images with artificial intelligence, comprising the steps of performing image pre-process, abnormal pattern determination and classification on a plurality of kidney ultrasound images to obtain a training image information, followed by performing analysis and processing of the training image information with deep-learning model, model optimization and model adjustment and calibration steps, in order to obtain an interpretation model. The interpretation model is used to analyze a kidney ultrasound image to be analyzed in order to obtain a prediction result on whether the kidney ultrasound image to be analyzed is abnormal or non-anomalous. In addition, if the kidney ultrasound image to be analyzed is abnormal, its abnormal pattern and accuracy can be further understood from the analysis result, in order to provide it as a reference for the medical personnel to diagnose or treat kidney disease.

To be more specific, the kidney ultrasound images used as the training image are obtained after experienced nephrological experts perform abnormal pattern determination and classification on the image. In addition, during the determination of the abnormal pattern, it is performed according to a predefined abnormal classification determination standard; wherein the "abnormal classification determination standard" refers to strictness for determining abnormal patterns, and it may include the relaxed classification standard, intermediate classification standard or strict classification standard. For example: the relaxed classification standard means that an experienced nephrological expert determines that kidney ultrasound image shows an abnormal pattern; the intermediate classification standard means that at least more than half of the total number of experienced nephrological experts determine the kidney ultrasound image shows an abnormal pattern; the strict classification standard means that at least more than two-thirds of the total number of the experienced nephrological experts determine the kidney ultrasound image shows an abnormal pattern. For abnormal or non-anomalous patterns that fail to be determined by all of the nephrological experts, the present invention is able to perform individual classification and training according to the strictness standard of different clinical requirements, in order to obtain the overall determination on the relaxed, intermediate or strict standard, thereby satisfying the clinical application demands.

In addition, the method for interpreting kidney ultrasound images with artificial intelligence disclosed by the present invention can be exclusively used to determine the kidney ultrasound images of a specific group, such as children or individuals of a specific age range, and the training image and information thereof can be selected according to the group applied. For example, when the method for interpreting kidney ultrasound images with artificial intelligence disclosed by the present invention is used to determine children kidney ultrasound images, the children ultrasound images are used as the training image.

The method for interpreting kidney ultrasound images with artificial intelligence disclosed by the present invention is able to increase the accuracy of machine determination of kidney ultrasound images, in order to allow non-kidney image experts to discover children kidney abnormality early, thereby achieving the effect of early diagnosis and early treatment, which can also be used as the basis for future development of remote medical care items.

"Deep-learning training model" described in the present invention refers to the multi-layered Artificial Neural Network (ANN) and the method of training the multi-layered ANN, and its algorithm method is similar to the computation is similar to the algorithmic model of neurons used in human brain.

"Normal" described in the present invention can also be understood as "non-anomalous", and it also refers to that the children kidney ultrasound image interpreted is not determined to have abnormal pattern.

"Abnormal" or "non-normal" described in the present invention refers to that the kidney ultrasound image interpreted is determined to match with the characteristic of an abnormal pattern. In addition, clinically, abnormal patterns mainly include but limited to the following 8 types: hydronephrosis, large kidney cyst, small kidney cyst, large kidney stone, small kidney stone, hyperechoic kidney, integrated abnormality type 1 and integrated abnormality type 2. Among which, the integrated abnormality type 1 includes the abnormalities of hydronephrosis, large kidney cyst, small kidney cyst, large kidney stone, small kidney stone and hyperechoic kidney, and the integrated abnormality type 2 includes the abnormalities of hydronephrosis, large kidney cyst, large kidney stone and hyperechoic kidney.

"Prediction module" described in the present invention refers to a determination method for determining the probability of kidney ultrasound image of a predefined abnormal pattern being abnormal or normal. For the present invention, the determination module uses the kidney ultrasound abnormal images classified to be the predefined abnormal pattern and the kidney ultrasound abnormal images classified to be non-anomalous as the training data and performs the deep learning to obtain result.

"Interpretation model" described in the present invention refers to a determination process and method for determining a children kidney ultrasound abnormal image to be analyzed being abnormal or non-anomalous, and it includes a plurality of prediction modules and rules module; wherein the rules module refers to the logic for selecting and executing the prediction module. For the present invention, the prediction module includes 8 prediction modules and at least one rules module. In addition, the rules module is obtained based on the prediction results of the prediction modules; wherein the rules module is able to select the prediction modules to be used from the prediction modules and provides the interpretation rules of the prediction modules selected, such as sequence. The technical features and effects of the present invention are described in several embodiments of the present invention in the following along with the accompanied drawings in detail.

Figure 1:
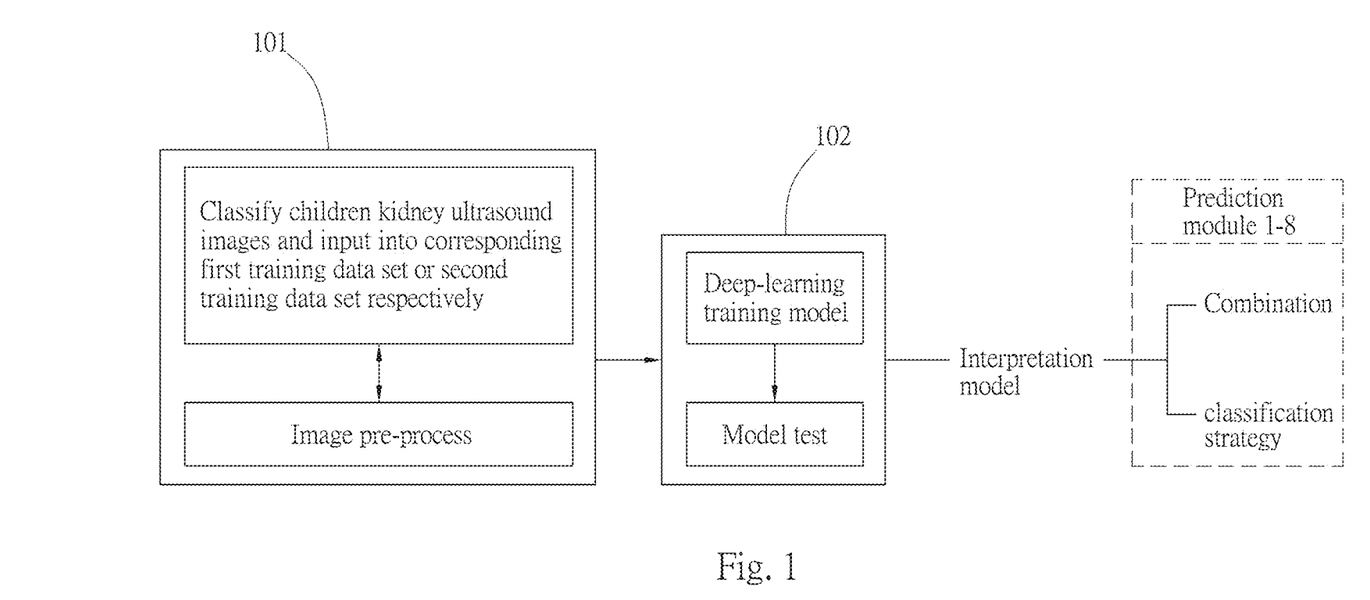
FIG. 1 is a partial flow chart of the method for interpreting kidney ultrasound images with artificial intelligence disclosed by an embodiment of the present invention.

As shown in FIG. 1, according to a method for interpreting kidney ultrasound images with artificial intelligence disclosed in an embodiment of the present invention, it is applied to the interpretation of children kidney ultrasound images, and it comprises the following steps:

Step 101: Establish a Data Set

Figure 2:
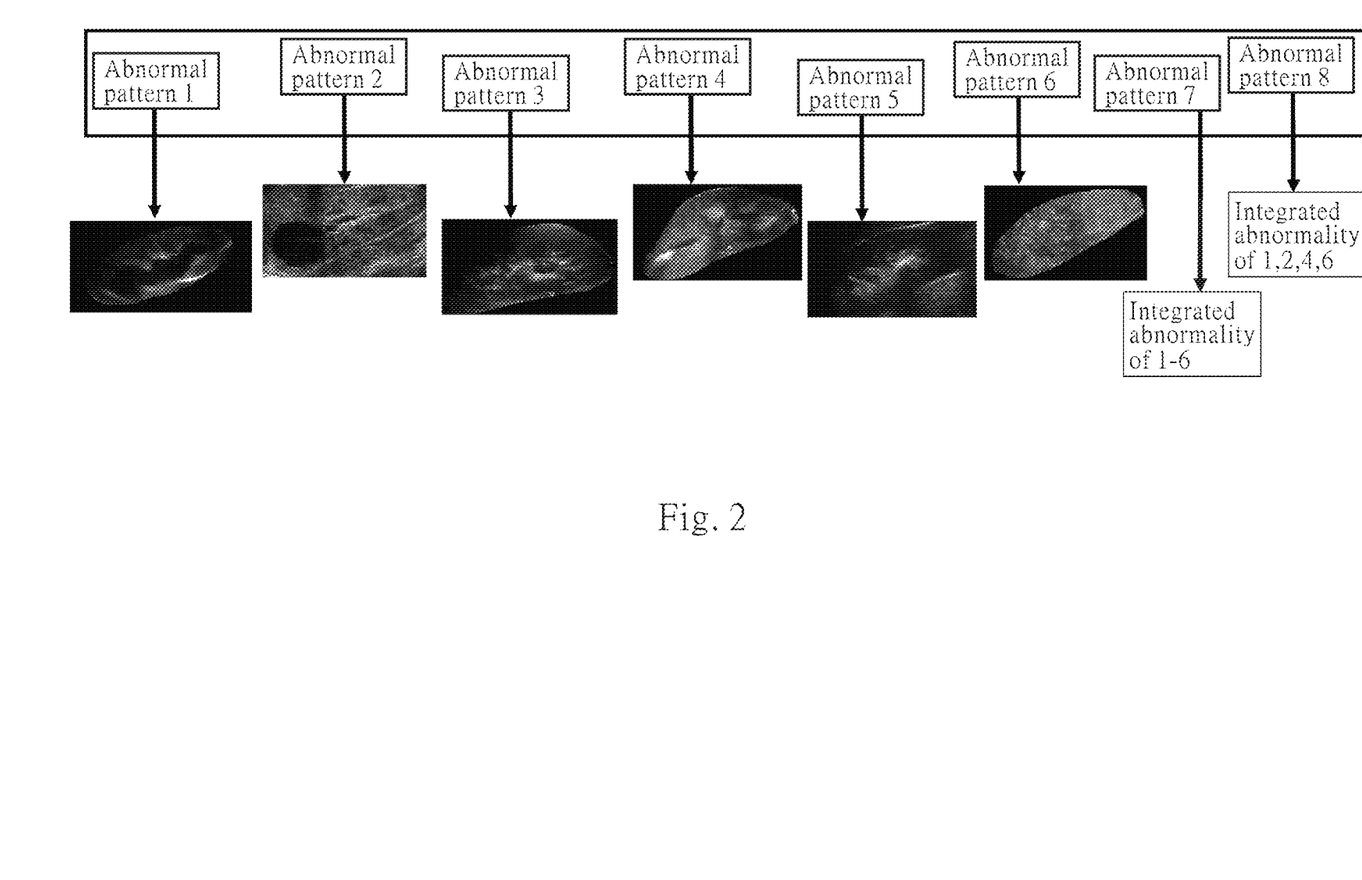
FIG. 2 is an illustration showing each one of the first training data sets and its internal abnormal images in Step 101 of an embodiment of the present invention.

Experienced children nephrological experts perform determination of abnormal patterns on the children kidney ultrasound images, and the children kidney ultrasound images are stored in a database and are classified according to the determination result. In other words, children kidney ultrasound images of the same abnormal pattern are classified in the same first training data set, and the children kidney ultrasound images determined to be non-anomalous are classified in a second training image set, in order to complete the establishment of a plurality of first training image sets and a second training image set; wherein each one of the first training image sets corresponds to one type of abnormal pattern. In this embodiment, there are a total of 8 first training image sets, as shown in FIG. 2, and they correspond to the following abnormal patterns respectively: hydronephrosis, large kidney cyst, small kidney cyst, large kidney stone, small kidney stone, hyperechoic kidney, integrated abnormality type 1 and integrated abnormality type 2.

Figure 3:
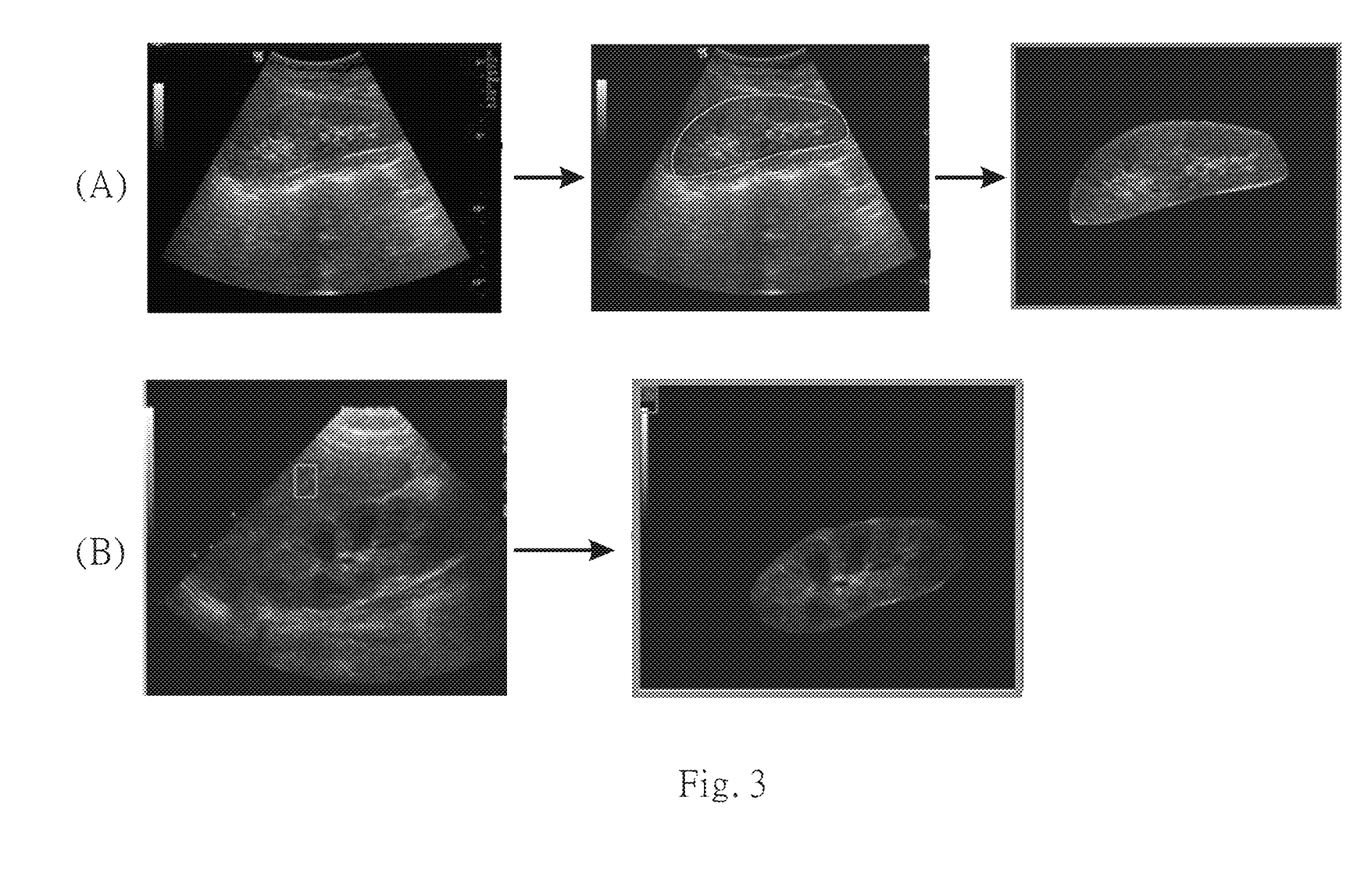

As shown in FIG. 3, each one of the children kidney ultrasound images in the first and second training image sets may be non-original children ultrasound images; in other words, they may be obtained from original ultrasound images undergoing an image pre-processing procedure. To be more specific, the image pre-processing procedure comprises the cleaning step and the capturing step, wherein:

The cleaning step refers to cleaning an auxiliary information, such as text, auxiliary pattern and symbol, in order to reduce interference elements in the image screen.

The capturing step refers to the selecting of the location of a kidney from the image screen and capturing a region of interest; wherein the capturing scope of the region of interest is determined depending upon the abnormal pattern of the children kidney ultrasound image. In other words, when the children kidney ultrasound image is classified as the non-integrated abnormal type, the region of interest includes a portion of the kidney; when the children kidney ultrasound image is classified as the integrated abnormal type, the region of interest includes a portion of the kidney and at least a portion of other tissue adjacent to the kidney.

Furthermore, during the image pre-process, images non-conforming with the training standard are also eliminated, such as insufficient resolution, overly complicated image features, failure to photograph image of the kidney, etc.

Each of the children kidney ultrasound images and its classification results are collected in order to obtain a training image information.

Step 102: Model Training

In this step, the interpretation model for predicting the children ultrasound image abnormal classification is obtained. The interpretation model comprises a plurality of prediction modules corresponding to each abnormal pattern and a rules module, wherein:

The obtaining procedure of each prediction module is as follows: obtaining at least a portion of children kidney ultrasound images from the first training image set and the second training image set related to a predefined abnormal pattern in order to be used as a training data; using a deep-learning training model to perform training on the training image information, in order to obtain the prediction module of the predefined abnormal pattern;

For the rules module, it is to perform algorithmic analysis on the interpretation results of the plurality of prediction modules in order to obtain the interpretation logic used by the prediction modules to perform image prediction analysis, and the interpretation logic comprises the selection rules and interpretation sequence of the prediction modules.

Figure 4:
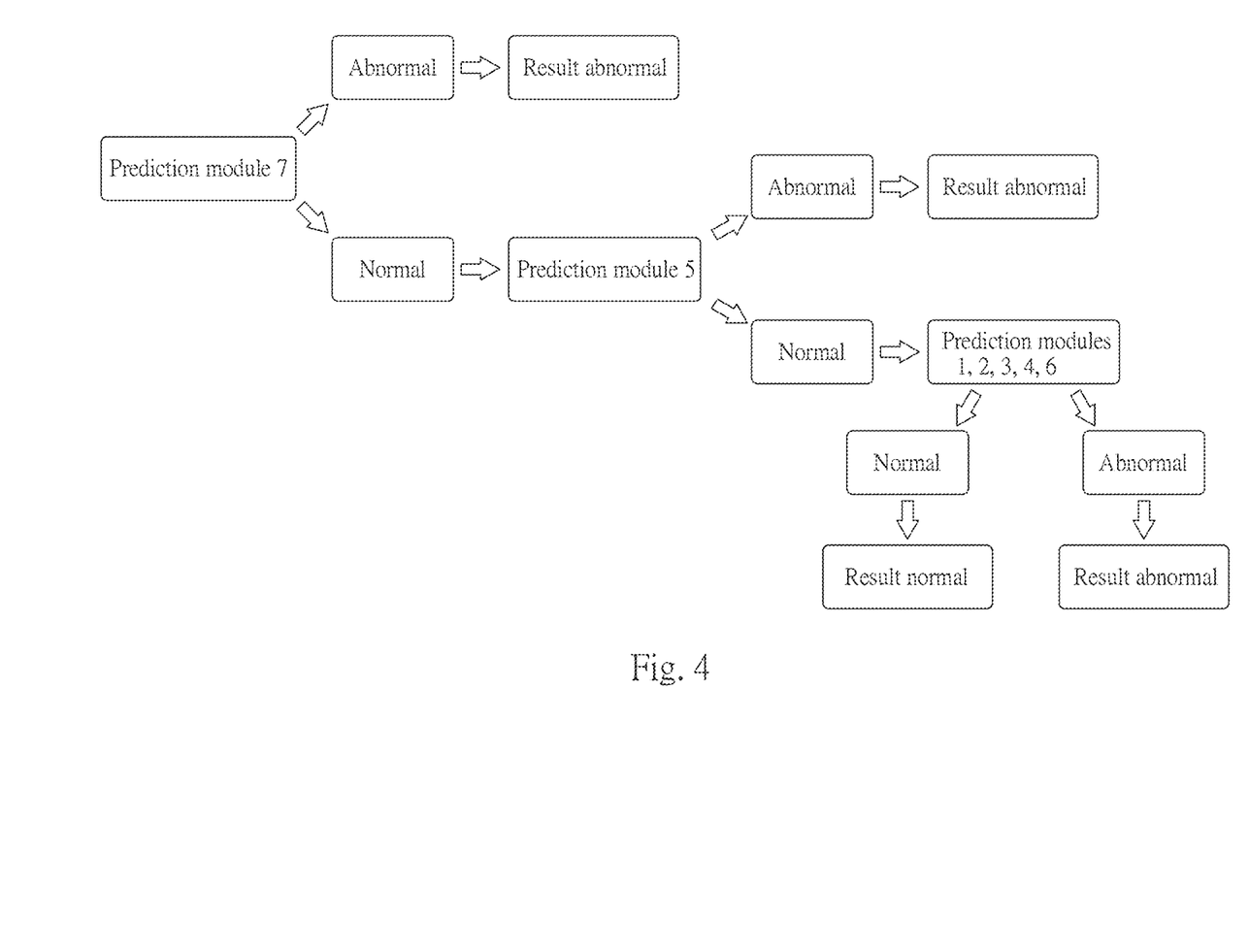
FIG. 4 is a flow chart of the rules module in Step 103 of an embodiment of the present invention.

In this embodiment, based on the 8 first training image sets corresponding to different abnormal patterns established in Step 101, 8 prediction modules are generated corresponding to each abnormal pattern in Step 102. In addition, the rules module can be obtained based on the prediction results of the prediction modules, as shown in FIG. 4. The interpretation module can then be obtained from the result of the combination of the prediction modules and the rules module.

To be more specific, the deep-learning training model is an image classification-related architecture, such as ResNet50 or other architectures in the technical field of the present invention and considered to be appropriate by persons having ordinary knowledge in the field.

In this embodiment, the deep-learning training model adopts the ResNet50 network architecture for designing the first half structure of the network, and the image data training weight adopts the ImageNet data pre-training weight for designing the second half (i.e., the last five layers) of the connection layer, in order to perform full-layer connection;

The framework used refers to the Pytorch deep-learning framework. During the initial stage of the model training, the data set used is relatively smaller (i.e., the training image quantity is relatively fewer), and the transfer learning method is adopted to train the ANN; wherein the data driven strategy adopts the data iteration method in order to increase the accuracy;

The training parameter refers to Parameter; wherein, Epoch is 30, Learning Speed is 0.01, and Less Function is NLLLoss( );

With the aforementioned training architecture, the size of each one of the prediction modules obtained in this embodiment is approximately 94 MB.

In addition, after the prediction module is obtained, the accuracy and sensitivity of the prediction module is inspected via manual or non-manual method. For example, the children kidney ultrasound images not being selected as the training data according to the predefined weight are used as a test data, in order to inspect whether the accuracy and sensitivity of the prediction module have reached the acceptable threshold value. If the accuracy and sensitivity of the prediction module cannot satisfy the acceptable threshold value, it is necessary to provide an optimization plan in order to optimize the prediction module.

In addition, the optimization plan includes the optimization of training method, image quality and quantity. The optimization of training method includes the selection of the deep-learning training model, and adjustment of the image data training weight, etc.

Furthermore, the optimization plan can be executed by a learning optimizer. The learning optimizer, such as Adam optimizer, can be selected for use based on the choice made by a person having ordinary knowledge in the field of the present invention. Furthermore, in addition to the aforementioned adjustment of machine learning parameters, the optimization plan may also include the abnormal classification determination standard and image pre-processing procedure in the optimization Step 101, in order to optimize the training image and its corresponding classification result. For example, when the abnormal classification determination standard is changed from the intermediate classification standard to the strict classification standard, the quantity of children kidney ultrasound images in the first training image set will be reduced, such that it is able to achieve the effect of increase of accuracy.

Step 103: The interpretation model is used to predict whether the children kidney ultrasound image to be analyzed is abnormal or non-anomalous.

Figure 5:
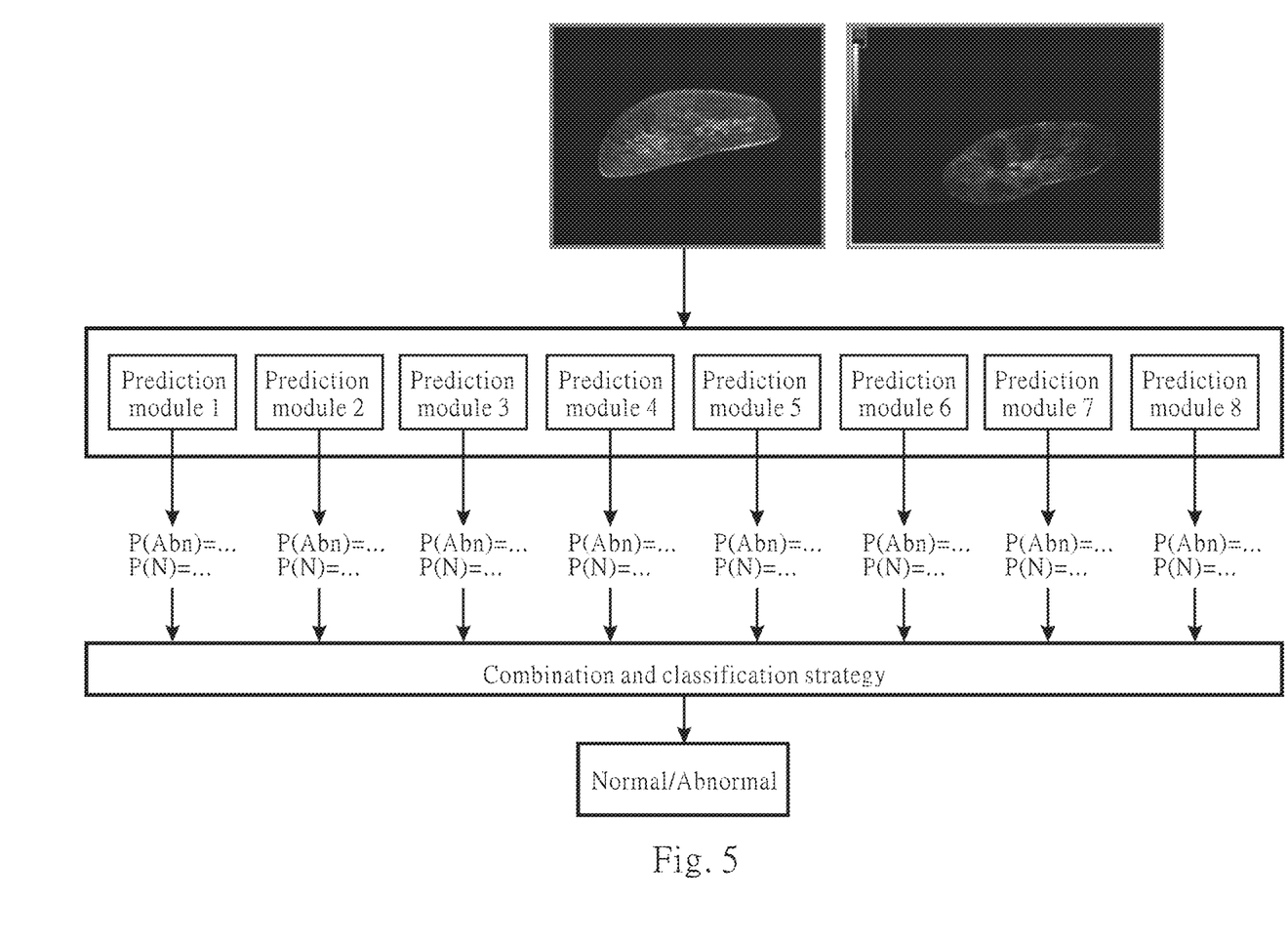
FIG. 5 is a flow chart of Step 103 disclosed by an embodiment of the present invention.

A children kidney ultrasound image to be analyzed is analyzed with the interpretation model, in order to obtain a prediction classification result. To be more specific, as shown in FIG. 5, each prediction module is used to analyze the children kidney ultrasound image to be analyzed first, and the abnormal pattern probability and non-anomalous probability of the children kidney ultrasound image to be analyzed corresponding to the prediction module are obtained. Next, according to the rules module, as shown in FIG. 4, the prediction module 7, the prediction module 5 and the prediction modules 2, 3, 4, 6 are used to perform analysis sequentially, in order to obtain the prediction result on whether the children kidney ultrasound image to be analyzed is normal or abnormal.

Furthermore, the children ultrasound image to be analyzed refers to a children ultrasound original image to be analyzed that has undergone the image pre-processing procedure, and since the image pre-processing procedure has been described in Step 101, details thereof is omitted hereafter.

Actual test has been conducted on the method for interpreting kidney ultrasound images with artificial intelligence disclosed in this embodiment, and the result is as shown in FIG. 6A. From the result shown in FIG. 6A, it can understood that each one of the children kidney ultrasound images to be analyzed utilizes the abnormal and non-anomalous probabilities after the analysis of each prediction module and the interpretation result of each prediction module comprehensively analyzed based on the rules module in order to obtain the prediction result of each one of the children kidney ultrasound images, and the aforementioned prediction result and each one of the children kidney ultrasound images to be analyzed are provided to experienced children nephrological experts to perform result determination and comparison. Accordingly, it can be understood that the prediction accuracy of the method for interpreting kidney ultrasound images with artificial intelligence disclosed by the present invention reaches 90% and above.

Figure 6B:
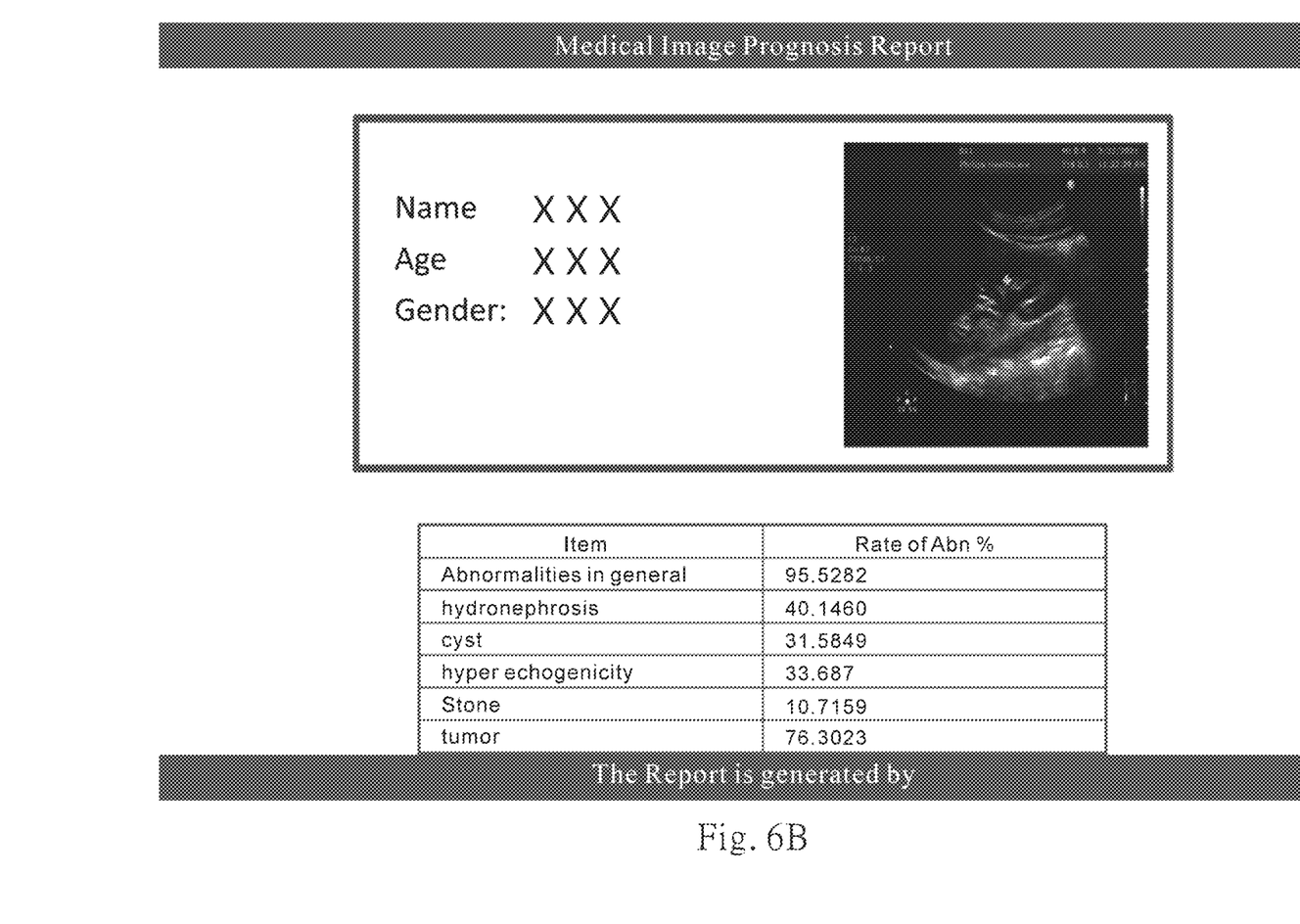
FIG. 6B shows a prediction result of kidney ultrasound image for each abnormal pattern by using the method for interpreting kidney ultrasound images with artificial intelligence disclosed by the present invention.

As shown in FIG. 6B, which is the result of another actual test of the method for interpreting a kidney ultrasound image with artificial intelligence disclosed by this invention. It can analyze the kidney ultrasound image to predict the rate of abnormal in each abnormal pattern, such as tumor, stone, hyper echogenicity, cyst, hydronephrosis and abnormalities in general, wherein the abnormalities in genera including more than one abnormal pattern and then show the prediction result in the user interface. According to the FIG. 6B, it can be understood that the method for interpreting kidney ultrasound images with artificial intelligence disclosed by the present invention can be used as a tool for assisting clinical medical personnel to quickly judge whether the kidney is abnormal.

According to the composition of the aforementioned steps, the method for interpreting kidney ultrasound images with artificial intelligence disclosed by the present invention can be used to swiftly and accurately predict the illness of a children kidney ultrasound image to be analyzed. If the features of the children kidney ultrasound image to be analyzed are relatively complicated or if it is an image that cannot be determined easily, the method for interpreting kidney ultrasound images with artificial intelligence disclosed by the present invention is able to utilize a plurality of prediction modules or combination thereof to interpreted one or a plurality of image abnormalities involved and to also provide corresponding accuracy rate as a reference for clinical and medical personnel, in order to achieve early screening of kidney abnormality, thereby reducing the expense and time spent by the patient.

Figure 7:
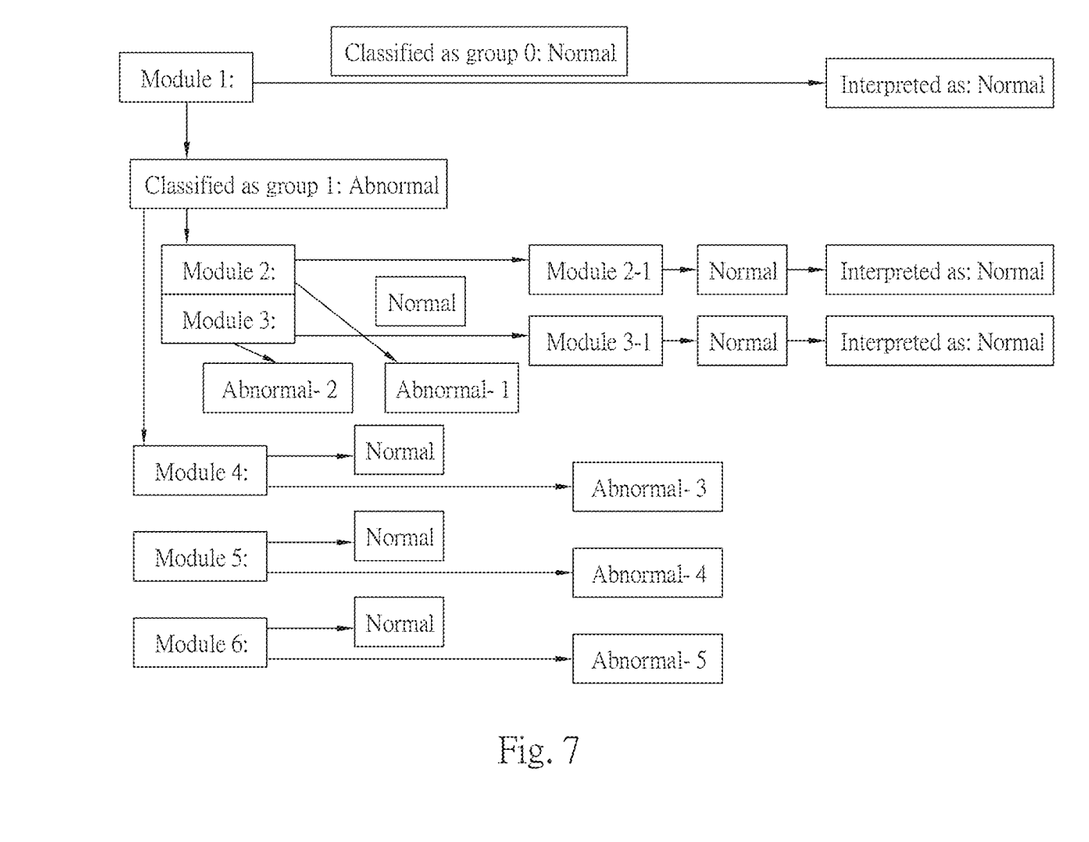
FIG. 7 is flow chart of the rules module disclosed by another embodiment of the present invention.

In another embodiment of the present invention, the rules module provided by the interpretation model is as shown in FIG. 7. When an interpretation model is used to analyze a children kidney ultrasound image to be analyzed, the interpretation model performs normal and abnormal probability analysis on the children kidney ultrasound image to be analyzed with each prediction module first, following which the prediction result of each prediction module is comprehensively determined according to the determination logic provided by the rules module. To be more specific, in the rules module, 6 prediction modules are selected, and the children kidney ultrasound image to be analyzed is predicted to be normal or abnormal according to the following determination logic: When the children kidney ultrasound image to be analyzed is interpreted by the prediction module 1 to be normal, it displays that the children kidney ultrasound image to be analyzed is normal; when the children kidney ultrasound image to be analyzed is determined by the prediction module to be abnormal, it then further uses the prediction modules 2, 2-1, 3, 3-1, 4, 5, 6 to perform analysis respectively. The prediction modules 2, 3, 4, 5, 6 are used to interpret the ultrasound images corresponding to different children kidney abnormalities respectively. Accordingly, after the children kidney ultrasound image to be analyzed is interpreted by the prediction modules 2, 3, 4, 5, 6 respectively, the normal or abnormal result obtained based on each prediction module can then be used to infer the type of kidney image abnormal condition that the provider of the children kidney ultrasound image to be analyzed may have, thereby achieving the objective of early screening of children kidney abnormality. Furthermore, according to the actual test, the abnormality screening rates of the prediction modules 1, 4, 5, 6 are greater than 90% respectively. For the prediction modules 2, 3 in conjunction with the prediction modules 2-1 and 3-1, the abnormality screening rates are also greater than 95%.

The kidney ultrasound original images used in each embodiment of the present invention are photographed by using different brands of market available machines, such as GE, Siemens, Toshiba, Acuson, and Philips. After verification, it is verified that the effect of the present invention is not affected by kidney ultrasound original images obtained from different brands of machines.

In still another embodiment of the present invention, the predefined weight is 80%, meaning that the 80% of the children kidney ultrasound images are randomly obtained from the first and second training image sets in order to be used as the training data, and the remaining 20% of the children kidney ultrasound images are used as the test data. Furthermore, 30 times of Epoch weight update is performed, allowing the accuracy rate of the abnormality interpretation to be close to 100%.

In addition, after the children kidney ultrasound image to be analyzed is classified and determined with the prediction module 3 of the interpretation model disclosed in the aforementioned embodiment and by experienced nephrological physicians respectively, the results of the two obtained are analyzed. It can then be understood that the sensitivity of interpreting the abnormality of the children kidney ultrasound image via the method for interpreting kidney ultrasound images with artificial intelligence disclosed by the present invention is 100%, its specificity is 50100% and its accuracy is 90100%.

According to a method for interpreting kidney ultrasound images with artificial intelligence disclosed in another embodiment of the present invention, the abnormal classifications, such as hydronephrosis, cyst, stone, hyperechoic, tumor and integrated abnormality, of test subjects at the age of 0-25 years old, are used to train at least 6 AI automatic prediction modules and ensemble as AI automatic interpretation model, in order to be used for analyzing kidney images of adults at the age above 18 years old.

To be more specific, normal kidney ultrasound images (N=50) and abnormal ultrasound images of test subjects at the age of 0-25 years old are obtained; wherein the abnormal ultrasound images include the following classifications: hydronephrosis (N=36), cyst (N=30), stone (N=50), hyperechoic (N=24), tumor (N=24), hydronephrosis and cyst (N=39), hyperechoic and hydronephrosis (N=47), which are classified and interpreted with the method for interpreting kidney ultrasound images with artificial intelligence disclosed by the present invention respectively, and the result is show in the following Table 1.

TABLE 1

Interpretation Result of Different Types of Ultrasound Images

| Category | Normal | Abnormal | Sensitivity | Accuracy |
| --- | --- | --- | --- | --- |
| Normal(N = 50) | 42 | 8 | — | 84% |
| Hydronephrosis(N = 36) | 2 | 34 | 94.4% | 94.4% |
| Cyst(N = 30) | 1 | 29 | 96.7% | 96.7% |
| Stone(N = 50) | 1 | 49 | 98% | 98% |
| Tumor(N = 24) | 3 | 21 | 87.5% | 87.5% |
| Hyperechoic (N = 24) | 0 | 24 | 100% | |
| Hyperechoic + Hydronephrosis (N = 47) | 0 | 47 | 100% | |
| Hyperechoic + Cyst(N = 39) | 2 | 37 | 94.9% | 94.9% |
| Overall | 50 | 250 | 96.8% | 94.7% |

From the result of the above Table 1, it can be proved that the method for interpreting kidney ultrasound images with artificial intelligence disclosed by the present invention can be used to interpret the kidney ultrasound images of test subjects at the age of 0-25 years old and to perform abnormality classification, and its accuracy even reaches 98%.

From the content of the aforementioned embodiments, it can be verified that the method for interpreting kidney ultrasound images with artificial intelligence disclosed by the present invention is able to automatically generate the interpretation model that can be used to determine whether the kidney ultrasound images from different age groups are normal, and abnormality classification can also be performed on kidney ultrasound images determined to be abnormal.

The interpretation model in the method for interpreting kidney ultrasound images with artificial intelligence disclosed by the present invention can be integrated with a ultrasound machine along with the information processing and transmission technologies, in order to achieve the effect of providing interpretation result timely. Accordingly, in another embodiment of the present invention, a system for interpreting kidney ultrasound images with artificial intelligence is provided, which mainly comprises a processing unit, an ultrasound machine and a display unit; wherein:

The processing unit includes a processing member for receiving a kidney ultrasound original image to be analyzed, and after performing an image pre-processing procedure, the interpretation model is used to perform analysis and a prediction result is obtained, in order to understand the classification of an abnormal pattern or a non-anomalous pattern of a kidney and an accuracy rate thereof; wherein the interpretation model is obtained according to Step 101 and Step 102 in the aforementioned embodiment.

An ultrasound machine is connected to the processing unit via a wired or wireless method and is able to transmit data and/or information with each other. In addition, the ultrasound machine includes an image generation member used to perform in vitro photograph of a kidney and to provide the kidney ultrasound original image to be analyzed. An image transfer module is used to transfer the kidney ultrasound original image to be analyzed to the processing member.

The display unit may be connected to the processing unit and the ultrasound machine via a wired or wireless method, and may also receive and present the prediction result from the processing unit.

With the assembly of the aforementioned elements, the system for interpreting kidney ultrasound images with artificial intelligence disclosed by the present invention can be applied to clinical diagnosis and interpretation of abnormality. In addition, the ultrasound machine can be configured as a handheld machine, such that it is able to facilitate the carrying and movement of the machine used by medical personnel and to further achieve the effect of timely interpretation.

What is claimed is:

1. A method for interpreting kidney ultrasound images with artificial intelligence, comprising the following steps:
   Step a: using a computer to obtain a plurality of pre-processed kidney ultrasound images from a database in order to establish a plurality of first training image sets and a second training image set; wherein the plurality of first training image sets correspond to different classifications of abnormal patterns respectively, and each one of the plurality of training image sets comprises a plurality of kidney ultrasound images belonging to one of the abnormal patterns classified, and the second training image set comprises a plurality of non-anomalous children kidney ultrasound images classified;
   Step b: using at least one of the kidney ultrasound images in the first training image sets and at least one of the kidney ultrasound images in the second training set as a training data, using a deep-learning training model to perform classification and computation in order to obtain an interpretation model, wherein:
   the interpretation model comprises a plurality of prediction modules corresponding to the abnormal patterns respectively and a rules module; wherein the rules module is a model analysis logic obtained from a result of abnormal probability and normal probability obtained from comprehensive analysis of the prediction modules, in order to select all or a portion of the prediction modules and to form at least two sets of different interpretation sequence combinations;
   Step c: using the computer to perform analysis on a kidney ultrasound image to be analyzed pre-processed by the computer according to the rules module and based on the selected interpretation sequence via all or a portion of the prediction modules, in order to obtain a prediction classification result of the kidney ultrasound image to be analyzed; wherein the prediction classification result is used to understand the kidney ultrasound image to be analyzed belongs to an abnormal classification or a non-anomalous classification;
   wherein the pre-process undergone by the kidney ultrasound images and the children kidney ultrasound image to be analyzed further comprises cleaning of an auxiliary information and capturing of a region of interest; the auxiliary information comprises a text, an auxiliary pattern, a symbol or a combination of at least two thereof; at least a portion of the region of interest comprises an image corresponding to a kidney or further comprises an image of a portion of other human tissue adjacent to the kidney.

2. The method for interpreting kidney ultrasound images with artificial intelligence according to claim 1, wherein the abnormal patterns comprise a hydronephrosis, a large kidney cyst, a small kidney cyst, a large kidney stone, a small kidney stone, a hyperechoic kidney or a combination of at least two thereof.

3. The method for interpreting kidney ultrasound images with artificial intelligence according to claim 1, wherein in Step b, the deep-learning model adopts a transfer learning to perform training.

4. The method for interpreting kidney ultrasound images with artificial intelligence according to claim 1, wherein in Step b, according to a predefined weight, the plurality of kidney ultrasound images complying with a quantity of the predefined weight are respectively obtained from each one of the first training image sets and the second training image set as the training data, and the remaining kidney ultrasound images not selected as the training data are used as a test data.

5. The method for interpreting kidney ultrasound images with artificial intelligence according to claim 1, wherein each one of the first training image sets is established according to a predefined abnormal classification determination standard.

6. A system for interpreting kidney ultrasound images with artificial intelligence, comprising:
   a processing unit having a processing member for receiving a kidney ultrasound original image to be analyzed, and after performing an image pre-processing procedure, using the interpretation model according to claim 1 to perform analysis and to obtain a prediction result, in order to understand a classification of an abnormal pattern or a non-anomalous pattern of a kidney and an accuracy rate thereof; and
   an ultrasound machine having an image generation member providing the kidney ultrasound original image to be analyzed, an image transfer module for transferring the kidney ultrasound original image to be analyzed to the processing member.

7. The system for interpreting kidney ultrasound images with artificial intelligence according to claim 6, wherein the processing unit, the ultrasound machine and the display unit are connected to each other via a wired or a wireless method.

\* \* \* \* \*